US011036659B2

(12) United States Patent
Chin (10) Patent No.: US 11,036,659 B2
(45) Date of Patent: Jun. 15, 2021

(54) MEMORY SYSTEM FOR RECEIVING COMMUNICATION INFORMATION FROM EXTERNAL DEVICE VIA VIRTUAL CHANNELS AND CONTROL METHOD OF MEMORY SYSTEM

(71) Applicant: TOSHIBA MEMORY CORPORATION, Minato-ku (JP)

(72) Inventor: Yoon Tze Chin, Fujisawa (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 16/557,371

(22) Filed: Aug. 30, 2019

(65) Prior Publication Data

US 2020/0301859 A1     Sep. 24, 2020

(30) Foreign Application Priority Data

Mar. 20, 2019   (JP) .............................. JP2019-052380

(51) Int. Cl.
*G06F 13/18* (2006.01)
*G06F 13/42* (2006.01)
*G06F 13/16* (2006.01)

(52) U.S. Cl.
CPC .......... *G06F 13/18* (2013.01); *G06F 13/1668* (2013.01); *G06F 13/4282* (2013.01); *G06F 2213/0026* (2013.01)

(58) Field of Classification Search
USPC ............. 710/5–6, 38, 40, 111–123, 244, 309
See application file for complete search history.

(56) References Cited

U.S. PATENT DOCUMENTS

| 2013/0138833 | A1* | 5/2013 | Coronado | G06F 3/0635 709/240 |
| 2015/0169244 | A1* | 6/2015 | Asnaashari | G06F 3/0688 711/103 |
| 2015/0254088 | A1 | 9/2015 | Chou et al. | |
| 2015/0356020 | A1 | 12/2015 | Desai et al. | |
| 2016/0321012 | A1 | 11/2016 | Clark et al. | |
| 2017/0075572 | A1 | 3/2017 | Utevsky et al. | |
| 2017/0177222 | A1 | 6/2017 | Singh et al. | |
| 2018/0095915 | A1 | 4/2018 | Prabhakar et al. | |
| 2020/0089404 | A1* | 3/2020 | Richter | G06F 3/061 |

FOREIGN PATENT DOCUMENTS

JP        2017-512350 A       5/2017

* cited by examiner

*Primary Examiner* — Ilwoo Park
(74) *Attorney, Agent, or Firm* — Oblon, McClelland, Maier & Neustadt, L.L.P.

(57) ABSTRACT

According to one embodiment, a memory system includes a nonvolatile memory (NVM) and a controller. The controller communicates with an external device via virtual channels (VC) defined in PCI Express Base Specification (PCIe). The external device communicates with the NVM of the memory system per NVM Express Base Specification (NVMe). The controller manages a set of priority relation information (PRI), which maps each priority of Weighted Round Robin with Urgent Priority Class Arbitration mechanism defined in NVMe, to a specific VC. Using the PRI, the controller ensures that the same VC is used throughout the command execution transactions. Quality of Service of communication between the external device and the memory system can thus be improved.

19 Claims, 6 Drawing Sheets

FIG. 1

| Priority relation information | |
|---|---|
| NVMe priority information | PCIe priority information |
| Low priority | VC0 |
| Medium priority | VC1 |
| High priority | VC2 |
| Urgent priority | VC3 |
| Admin | VC4 |

MEMORY SYSTEM FOR RECEIVING COMMUNICATION INFORMATION FROM EXTERNAL DEVICE VIA VIRTUAL CHANNELS AND CONTROL METHOD OF MEMORY SYSTEM

CROSS-REFERENCE TO RELATED APPLICATIONS

This application is based upon and claims the benefit of priority from Japanese Patent Application No. 2019-052380, filed Mar. 20, 2019, the entire contents of which are incorporated herein by reference.

FIELD

Embodiments described herein relate generally to a memory system and a control method of the memory system.

BACKGROUND

A solid state drive (SSD) includes a nonvolatile memory (NVM) and has an interface complying with predetermined specification. The SSD and an information processing device transmit and receive, for example, commands, user data, completions, and the like in accordance with the predetermined specification. For example, the SSD writes user data received from the information processing device to the NVM, and transmits user data read from the NVM to the information processing device, in accordance with the predetermined specification.

DETAILED DESCRIPTION

An embodiment will be described hereinafter with reference to the accompanying drawings. In the following description, those relevant items having substantially the same function and configuration will be denoted by the same reference number, and the description will be repeated only when necessary. Further, the following embodiment illustrates a device and a method which give concrete forms to technical ideas, and the technical ideas of the embodiment are not intended to limit materials, shapes, structures, arrangements, etc., of components to those descried below. The technical ideas of the embodiment can be modified in various manners in the scope of patent claims.

In general, according to one embodiment, a memory system includes an NVM and a controller. The controller communicates with an external device via virtual channels, and controls the NVM. The virtual channels include a first virtual channel and a second virtual channel. The virtual channels comply with Peripheral Component Interconnect Express Base Specification (hereinafter referred to as PCIe). The controller manages a set of priority relation information in which the first virtual channel is associated with a first priority and the second virtual channel is associated with a second priority. In this context, the second priority has a lower priority than the first priority. The controller receives, from the external device, first communication information corresponding to the first priority or second communication information corresponding to the second priority. In a case where the first communication information is received, the controller requests third communication information associated with the first communication information to the external device via the first virtual channel, based on the priority relation information. In a case where the second communication information is received, the controller requests fourth communication information associated with the second communication information to the external device via the second virtual channel, based on the priority relation information.

In the embodiment, the memory system complies with first specification communicates with an external information processing device. The memory system may be incorporated in the information processing device.

In addition, the memory system complies with second specification which is different from the first specification to execute a command issued by the information processing device.

In the following description, for example, the first specification is PCIe and the second specification is NVM Express Base Specification (hereinafter referred to as NVMe). However, the first specification and the second specification can be changed as appropriate.

In the following description, for example, communication information is communicated and processed in compliant with PCIe and NVMe. The communication information is a generic term of, for example, command notification, command request, command, descriptor of data-transfer request, descriptor of data-transfer, data transmitted or received between the controller and the external device per execution of the command, completion, or the like.

Figure 1:
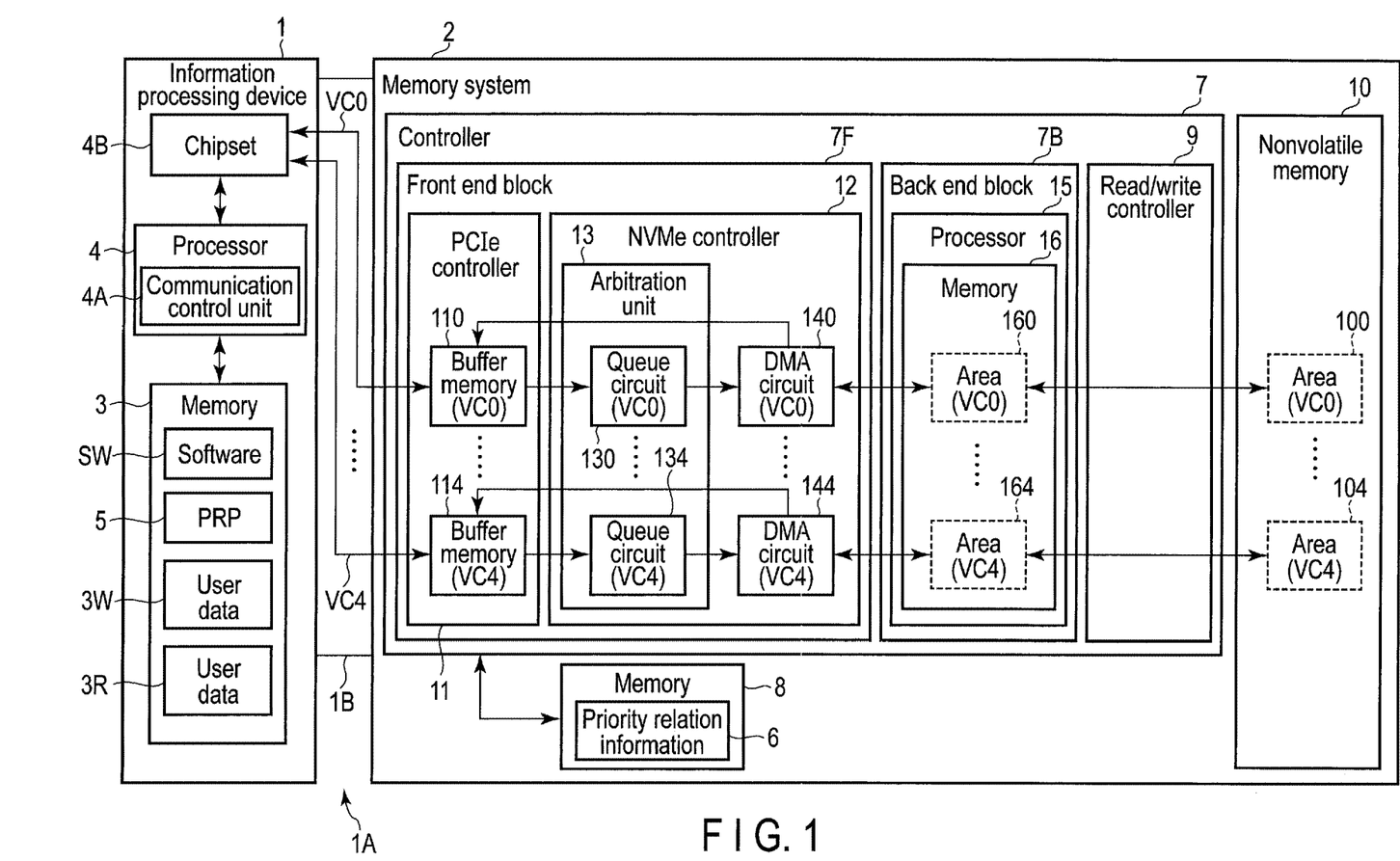
FIG. 1 is a block diagram illustrating a configuration example of an information processing system for an embodiment.

FIG. 1 is a block diagram illustrating a configuration example of an information processing system 1A for the embodiment.

The information processing system 1A includes an information processing device 1 and a memory system 2.

The information processing device 1 may be called, for example, a host. The information processing device 1 may be, for example, a personal computer, a server, a client device, a cellular telephone, a mobile information terminal, an imaging device, a sensor device, or the like.

In the embodiment, the memory system 2 is explained by an example of an SSD, but the same configuration and functions can be applied to any nonvolatile storage devices such as a hard disk drive (HDD), a memory card, a hybrid memory system including an HDD and an SSD, an optical disk device, and the like.

First, a configuration of the information processing device 1 will be described.

The information processing device 1 includes a memory 3, a Chipset 4B, and a processor 4. The configuration and operation of the information processing device 1 described in the embodiment are mere examples and are not limited to these.

The memory 3 stores software SW, a physical region pointer (PRP) 5, user data 3W to be written to the memory system 2, and user data 3R read from the memory system 2. A PRP is defined under, for example, NVMe and is indicative of, for example, descriptor of data-transfer.

The Chipset 4B executes communication between the information processing device 1 and the memory system 2 in accordance with an instruction of the processor 4.

The processor 4 functions as a communication control unit 4A by executing the software SW stored in the memory 3. The software SW may be, for example, an operating system, an application program, a driver or the like. The processor 4 may be formed by an electronic circuit.

The communication control unit 4A transmits instructions to the Chipset 4B and controls the communication between the information processing device 1 and the memory system 2 by using the Chipset 4B. To simplify the following description, the description of the Chipset 4B will be omitted.

In a communication initialization phase between the information processing device 1 and the memory system 2, the former will probe the capabilities of the latter (hereinafter simply called virtual channel capability registers information), and receive the virtual channel capability registers information from the latter.

The communication control unit 4A determines the number of virtual channels that can be used in the communication between the information processing device 1 and the memory system 2, based on the received virtual channel capability registers information in the PCIe controller 11. The virtual channels and the virtual channel capability registers are defined under, for example, PCIe.

In the embodiment, it is assumed that the number of usable virtual channels is five and that virtual channels VC0 to VC4 can be used for the communication between the information processing device 1 and the memory system 2. In another embodiment, the number of virtual channels may be two or more. More specifically, the number of virtual channels may be two or more and smaller than or equal to the number of the maximum virtual channels defined in PCIe.

The communication control unit 4A transmits a command notification to the memory system 2. The command notification is defined under, for example, NVMe.

The communication control unit 4A receives a command request corresponding to the command notification from the memory system 2, via a virtual channel determined by the memory system 2.

The communication control unit 4A transmits a command corresponding to the command request to the memory system 2, via the same virtual channel determined by the memory system 2.

The communication control unit 4A receives a PRP request from the memory system 2, via the virtual channel determined by the memory system 2.

The communication control unit 4A reads the PRP 5 corresponding to the PRP request from the memory 3 and transmits the PRP 5 to the memory system 2, via the virtual channel determined by the memory system 2.

If the command transmitted to the memory system 2 is a read command, the communication control unit 4A will receive the corresponding user data 3R from the memory system 2 via the virtual channel determined by the memory system 2. The communication control unit 4A stores the user data 3R at a location indicated by PRP 5 in the memory 3. After receiving the user data 3R, the communication control unit 4A receives a completion from the memory system 2, via the virtual channel determined by the memory system 2.

If the command transmitted to the memory system 2 is a write command, the communication control unit 4A receives user data request from the memory system 2, via the virtual channel determined by the memory system 2. The communication control unit 4A reads the user data 3W corresponding to the user data request from the memory 3 and transmits the user data 3W to the memory system 2, via the virtual channel determined by the memory system 2. After transmitting the user data 3W, the communication control unit 4A receives a completion from the memory system 2, via the virtual channel determined by the memory system 2.

The communication control unit 4A may be implemented in another block of the information processing device 1, instead of the processor 4. The processor 4 and the Chipset 4B may be combined. For example, the processor 4 and the Chipset 4B may be formed as one chip or one package. The processor 4, the Chipset 4B, and the memory 3 may be formed as one chip or one package.

Next, a configuration of the memory system 2 will be described. The configuration and operation of the memory system 2 described in the embodiment are mere examples and are not limited to these.

The memory system 2 includes a controller 7, a memory 8, and a nonvolatile memory 10. For the memory 8, for example, a dynamic random access memory (DRAM) may be used.

In the embodiment, the controller 7 may be formed by an electronic circuit such as system-on-a-chip (SoC). Some functions of the controller 7 may be realized by dedicated hardware or may be realized by executing software such as firmware by the processor. The controller 7 and the memory 8 may be combined. For example, the controller 7 and the memory 8 may be formed as one chip or one package. The controller 7, the memory 8, and the nonvolatile memory 10 may be formed as one chip or one package.

The controller 7 may be connected with the information processing device 1 via physical communication lines 1B. The controller 7 includes a front end block 7F, a back end block 7B, and a read/write controller 9. The controller 7 receives a command from the information processing device 1 and controls the nonvolatile memory 10 in accordance with the command. For example, when the controller 7 receives a read command from the information processing device 1, the controller executes a read operation on the nonvolatile memory 10. When the controller 7 receives a write command from the information processing device 1, the controller 7 executes a write operation on the nonvolatile memory 10.

The front end block 7F includes the PCIe controller 11 that operates per PCIe, and the NVMe controller 12 that operates per NVMe.

The PCIe controller 11 has buffer memories 110 to 114, which correspond to virtual channels VC0 to VC4 respectively, to store communication information exchanged between the information processing device 1 and the memory system 2. Temporary storage devices of other type such as queues may be used instead of the buffer memories 110 to 114.

That is, the PCIe controller 11 stores the communication information, which is received from the information processing device 1 via the virtual channels VC0 to VC4, in the buffer memories 110 to 114, respectively. Similarly, the PCIe controller 11 stores the communication information, which is received from queue circuits 130 to 134, in the buffer memories 110 to 114, respectively.

The PCIe controller 11 transmits communication information stored in the buffer memories 110 to 114 to the information processing device 1, via the virtual channels VC0 to VC4, respectively.

The PCIe controller 11 shares information about usable virtual channels VC0 to VC4 to the NVMe controller 12. The NVMe controller 12 creates priority relation information 6 by associating the usable virtual channels VC0 to VC4 with NVMe priority information, and stores the priority relation information 6 in the memory 8. In a different implement, a different block in the memory system 2 may create and store the priority relation information 6 in the memory 8.

In an operation phase, the PCIe controller 11 receives a command notification from the information processing device 1. The PCIe controller 11 transmits the received command notification to the NVMe controller 12. The NVMe controller 12 reads the priority relation information 6 from the memory 8, and determines which virtual channel to be used for transmitting the command request, based on the submission queue (SQ) priority of the received command notification. The PCIe controller 11 stores the command request in the buffer memory corresponding to the determined virtual channel, and then transmits the command request to the information processing device 1 via the determined virtual channel.

The NVMe controller 12 includes an arbitration unit 13 and direct memory access (DMA) circuits 140 to 144. The arbitration unit 13 implements Weighted Round Robin with Urgent Priority Class Arbitration (WRRUPCA) defined in NVMe. The NVMe controller 12 processes selected communication information stored in the queue circuits 130 to 134 by WRRUPCA algorithm. Note that each of the queue circuits 130 to 134 is assumed to contain, for example, a class of SQ.

The subsequent NVM command processing in the NVMe controller 12 includes four steps: "command fetch and interpretation", "PRP fetch and interpretation", "data transfer", and "completion transmission".

In the embodiment, an algorithm such as WRRUPCA described above is assumed to be used for arbitration. However, other arbitration algorithms that assign different priorities to SQ may be used instead of WRRUPCA.

The queue circuits 130 to 134 are mapped to the virtual channels VC0 to VC4, respectively. The queue circuits 130 to 134 may adopt a first-in first-out method.

The NVMe controller 12 executes the subsequent NVM command processing based on the selected communication information by the arbitration unit 13.

The DMA circuits 140 to 144 are mapped to the virtual channels VC0 to VC4, respectively.

The back end block 7B includes a processor 15. The processor 15 includes a memory 16. The memory 16 is divided into areas 160 to 164, which are mapped to the virtual channels VC0 to VC4, respectively. The memory 16 may also be implemented outside of the processor 15. In such a case, the processor 15 will write to and read from the external memory 16.

The processor 15 transfers data stored in each of the areas 160 to 164 to the nonvolatile memory 10 via the read/write controller 9. Similarly, the processor 15 transfers data stored in the nonvolatile memory 10 to each of the areas 160 to 164, via the read/write controller 9. In both cases, the processor 15 may use a different algorithm to select which area in Memory 16 should be serviced.

The nonvolatile memory 10 is, for example, a NAND flash memory but may be other nonvolatile semiconductor memories such as magnetoresistive random access memory (MRAM), phase change random access memory (PRAM), resistive random access memory (ReRAM), or ferroelectric random access memory (FeRAM). For example, the nonvolatile memory 10 may be a magnetic memory, a semiconductor memory of a three-dimensional structure, or the like.

The nonvolatile memory 10 is logically divided into areas 100 to 104, which are mapped to the virtual channels VC0 to VC4, respectively.

In moving data from the queue circuits 130 to 134 to the nonvolatile memory 10, each of the DMA circuits 140 to 144 transfers selected data from the corresponding queue circuits 130 to 134, to the respective areas 160 to 164 in the memory 16, based on the arbitration algorithm in the arbitration unit 13. The processor 15 transmits the user data read from the areas 160 to 164 of the memory 16 to the read/write controller 9. The read/write controller 9 then writes the corresponding data to the areas 100 to 104 of the nonvolatile memory 10, respectively.

In moving data from the nonvolatile memory 10 to the buffer memories 110 to 114 of the PCIe controller 11, the read/write controller 9 reads data from the areas 100 to 104 of the nonvolatile memory 10, and transmits the data to the processor 15. The processor 15 then stores the received user data to the areas 160 to 164 of the memory 16, respectively. The DMA circuits 140 to 144 transfer the user data from the areas 160 to 164 in the memory 16 to the buffer memories 110 to 114 of the PCIe controller 11, respectively.

Figure 2:
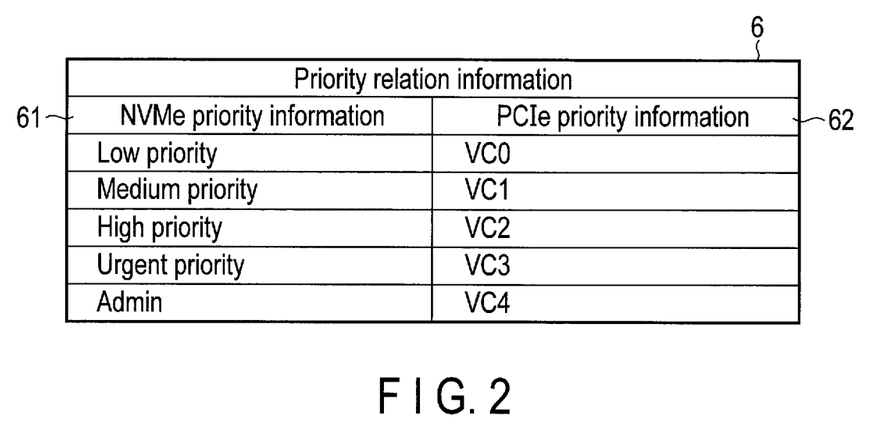
FIG. 2 is a look-up table illustrating an example of priority relation information of the embodiment.

FIG. 2 is a look-up table illustrating an example of the priority relation information 6.

The priority relation information 6 includes NVMe priority information 61 and PCIe priority information 62. In FIG. 2, the priority relation information 6 maps the virtual channels VC0 to VC4 of PCIe to priorities defined in NVMe.

The NVMe priority information 61 includes priorities used for WRRUPCA, for example, of which are Low priority, Medium priority, High priority, Urgent priority and Admin. The priority order in this case is, for example, Low priority<Medium priority<High priority<Urgent priority<Admin.

The PCIe priority information 62 complies with the priorities of the respective virtual channels VC0 to VC4 defined in PCIe. In FIG. 2, the priority order is, for example, VC0 priority<VC1 priority<VC2 priority<VC3 priority<VC4 priority.

The priority relation information 6 maps Low priority to VC0, Medium priority to VC1, High priority to VC2, Urgent priority to VC3, and Admin to VC4.

In the controller 7, communication information having a higher priority is transmitted, received and processed more preferentially than communication information having a lower priority. QoS (Quality of Service) for communication information with a higher NVMe priority can thus be improved.

The priority relation information 6 of FIG. 2 is a mere example and can be changed as appropriate. For example, multiple virtual channels may be mapped to one item in the NVMe priority information 61. Similarly, multiple items of the NVMe priority information 61 may be mapped to one virtual channel.

The PCIe controller 11 preferentially schedules and processes communication information based on the PCIe priority information 62.

The NVMe controller 12 preferentially schedules and processes communication information based on the NVMe priority information 61.

Figure 3:
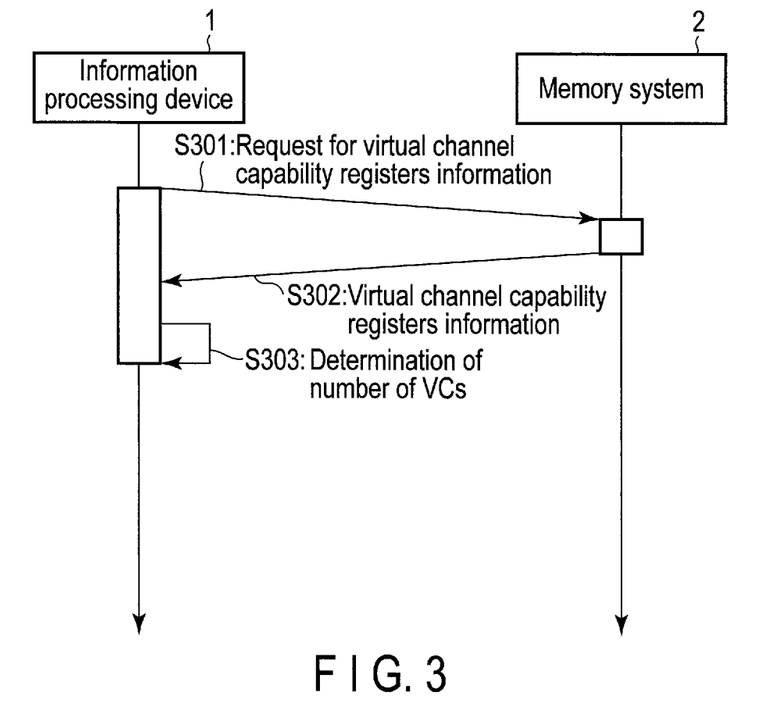
FIG. 3 is a sequence chart illustrating an example of an initialization process in determining the number of virtual channels used between the information processing system and the memory system of the embodiment.

FIG. 3 is a sequence chart illustrating an example of the initialization process in determining the number of virtual channels used between the information processing system 1A and the memory system 2 of the embodiment.

Specifically, the information processing device 1 transmits a request for virtual channel capability registers information to the memory system 2 in step S301. The virtual channel capability registers information includes, for example, the number of supported virtual channels in the memory system 2.

In step S302, the PCIe controller 11 of the memory system 2 transmits the virtual channel capability registers information to the information processing device 1.

In step S303, the information processing device 1 determines the number (five in the embodiment) of virtual channels that can be used between the information processing device 1 and the memory system 2, based on the virtual channel capability registers information received from the memory system 2.

Figure 4:
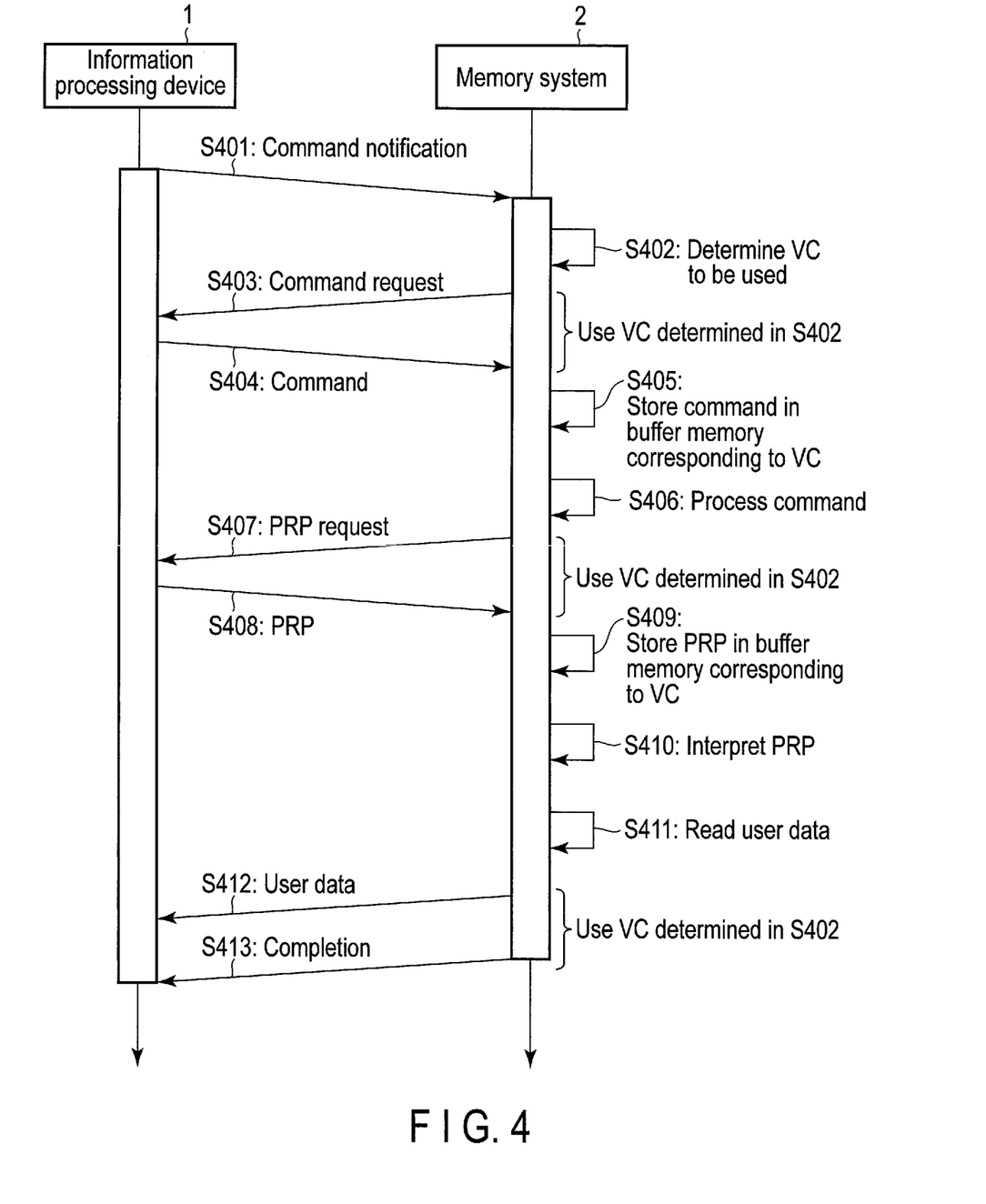
FIG. 4 is a sequence chart illustrating an example of NVM read command execution in the embodiment.

FIG. 4 is a sequence chart illustrating an example of NVM read command execution in the embodiment.

In step S401, the communication control unit 4A of the information processing device 1 transmits a NVM command notification, to the memory system 2, via one of the virtual channels VC0 to VC4.

In step S402, the NVMe controller 12 determines which priority is associated with a command, based on how the NVM command notification being sent to the controller. The NVMe controller 12 acts on the command notification priority, and determines which virtual channel to be used for a command request, based on the priority relation information 6. The NVMe controller 12 then shares the determined virtual channel information with the PCIe controller 11.

In this example, the virtual channel VC0 is determined as the virtual channel to be used. The same operation applies when the virtual channels VC1 to VC4 are determined to be used by the memory system 2.

In step S403, the PCIe controller 11 transmits a command request corresponding to the command notification to the information processing device 1, via the virtual channel VC0 determined in step S402.

Upon receiving the command request from the memory system 2, the communication control unit 4A transmits the command corresponding to the command request to the former in step 404, via the same virtual channel of the command request, per PCIe protocol.

In step S405, the PCIe controller 11 stores the received command in the buffer memory 110 corresponding to the virtual channel VC0. The PCIe controller 11 then transfers the command stored in the buffer memory 110 to the queue circuit 130, of which corresponds to the virtual channel VC0. The description from steps S403 to S405 corresponds to, for example, command fetch of the NVMe controller 12.

In step S406, the NVMe controller 12 processes the command stored in the queue circuit 130, of which is selected per the arbitration algorithm in the arbitration unit 13.

In step S407, the NVMe controller 12 transmits the PRP request to the information processing device 1, through the PCIe controller 11. The used virtual channel for this transmission is VC0, which was determined in step S402.

Upon receiving the PRP request from the memory system 2, the communication control unit 4A transmits the corresponding PRP 5 to the former in step S408, via the same virtual channel of the PRP request, per PCIe protocol.

In step S409, the PCIe controller 11 stores the received PRP 5 in the buffer memory 110 corresponding to the virtual channel VC0. The PCIe controller 11 then transfers the PRP 5 to the queue circuit 130. The description from steps S407 to S409 corresponds to, for example, PRP fetch of the NVMe controller 12.

The NVMe controller 12 stores the PRP 5 stored in the buffer memory 110 into the queue circuit 130 corresponding to the virtual channel VC0 determined in step S402.

In step S410, the NVMe controller 12 interprets the PRP stored in the queue circuit 130, of which is selected per the arbitration algorithm in the arbitration unit 13.

In step S411, the controller 7 reads the requested user data 3R from the nonvolatile memory 10, and stores the user data 3R in the buffer memory 110.

In step S412, the PCIe controller 11 transmits the user data 3R stored in the buffer memory 110 to the information processing device 1, via the virtual channel VC0 determined in step S402.

In step S413, the NVMe controller 12 stores completion in the buffer memory 110. The PCIe controller 11 transmits the completion to the information processing device 1, via the virtual channel VC0 determined in step S402. Step S413 corresponds to, for example, the completion transmission of the NVMe controller 12.

Figure 5:
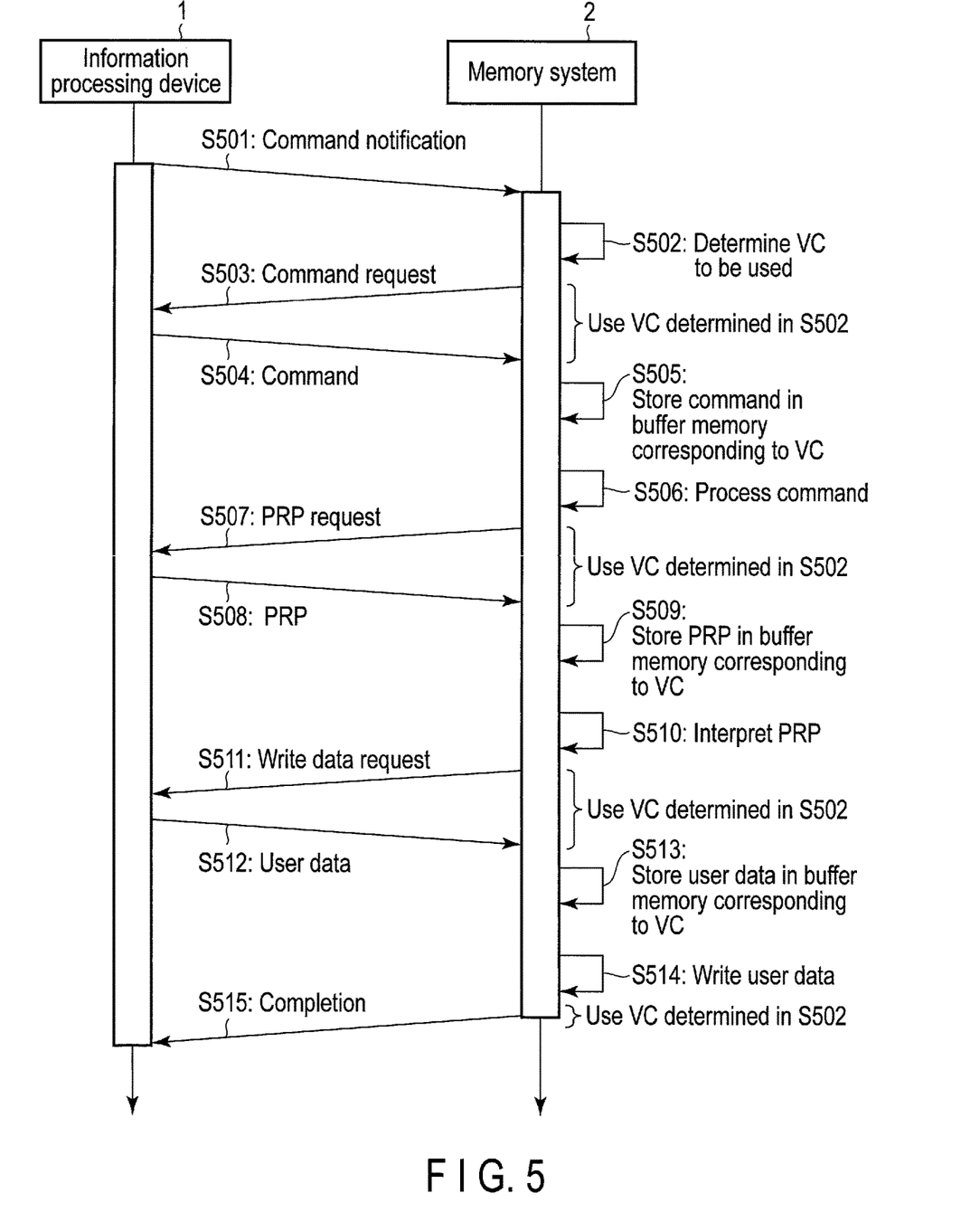
FIG. 5 is a sequence chart illustrating an example of NVM write command execution in the embodiment.

FIG. 5 is a sequence chart illustrating an example of NVM write command execution in the embodiment.

The descriptions for step S501 to step 510 will be omitted since the concept is basically same as those in S401 to step S410 of FIG. 4.

In step S511, the PCIe controller 11 transmits a write data request to the information processing device 1, via the virtual channel VC0 determined in step S502.

Upon receiving the write data request, the communication control unit 4A reads the corresponding user data 3W from the memory 3, and transmits the user data 3W to the memory system 2 in step S512.

In step S513, the PCIe controller 11 stores the received user data 3W in the buffer memory 110, and then transfers it to the queue circuit 130.

In step S514, the NVMe controller 12 transfers the user data 3W stored in the queue circuit 130 to the nonvolatile memory 10 via the back end block 7B and the read/write controller 9. The user data 3W of the queue circuit 130 is selected based on the arbitration algorithm of the arbitration unit 13.

In step S515, the NVMe controller 12 stores completion in the buffer memory 110. The PCIe controller 11 transmits the completion to the information processing device 1, via the virtual channel VC0 determined in step S502.

Figure 6:
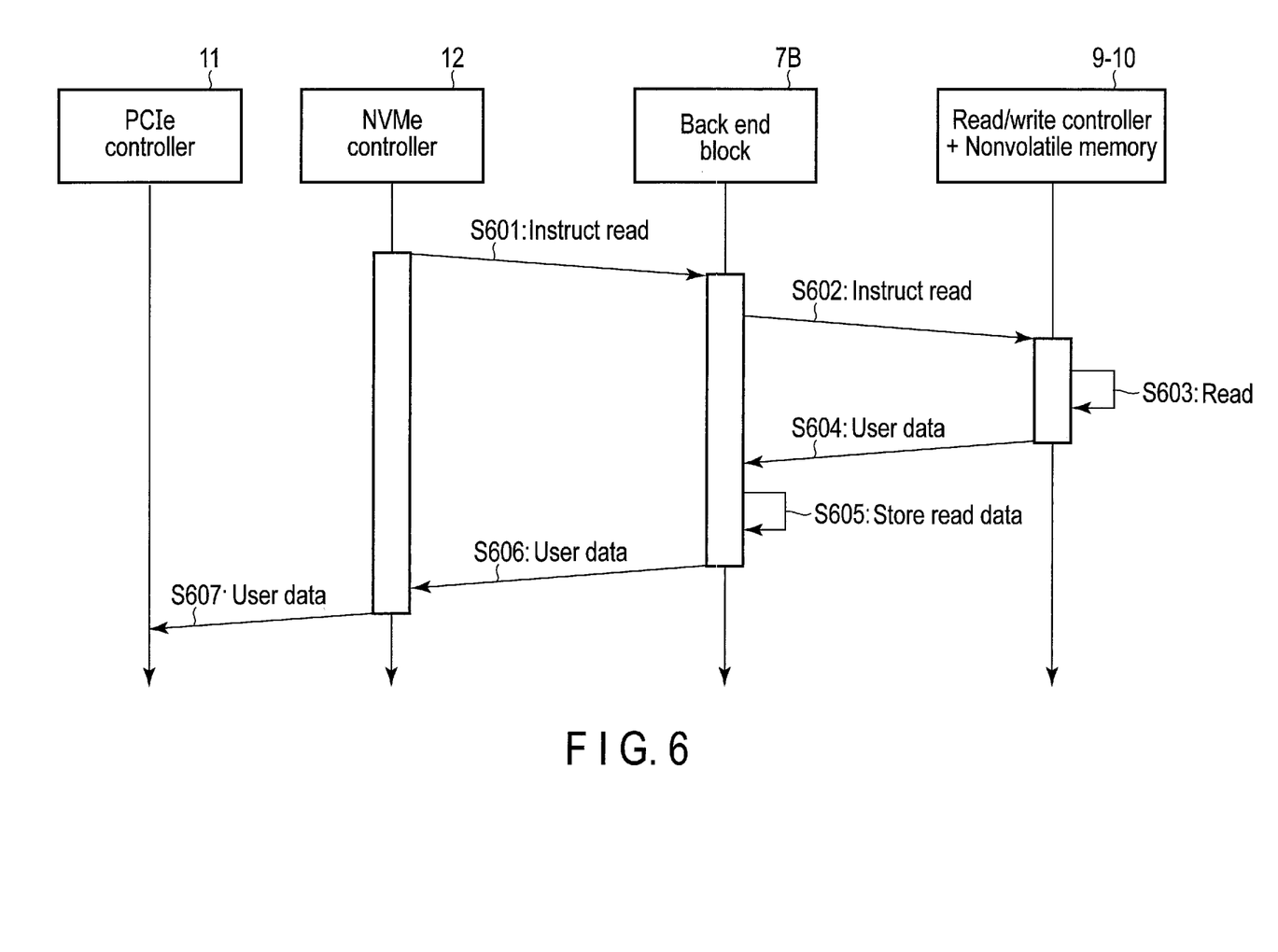
FIG. 6 is a sequence chart illustrating an example of NVM read command execution in the memory system of the embodiment.

FIG. 6 is a sequence chart illustrating an example of NVM Read command execution in the memory system 2 of the embodiment. FIG. 6 corresponds to step S411 of FIG. 4. In FIG. 6, the read/write controller 9 and the nonvolatile memory 10 are illustrated as one block 9-10 to simplify the description. The description of FIG. 6 focuses on the items that are associated with the virtual channel VC0. The corresponding descriptions for the virtual channels VC1 to VC4 are omitted, as the concept is the same.

In step S601, the NVMe controller 12 passes the relevant information to the back end block 7B, and instructs the back end block 7B to execute a read command.

In step S602, the back end block 7B instructs the read/write controller 9 to execute the read command, per the NVMe controller 12 instruction.

In step S603, the read/write controller 9 reads the user data 3R from the area 100 of the nonvolatile memory 10, which is associated with the determined virtual channel VC0.

In step S604, the read/write controller 9 transmits the user data 3R to the back end block 7B.

In step S605, the back end block 7B stores the user data 3R in the area 160, which is associated with the determined virtual channel VC0.

In step S606, the DMA circuit 140 of the NVMe controller 12 reads out the user data 3R stored in the area 160.

In step S607, the DMA circuit 140 stores the user data 3R in the buffer memory 110, of which is associated with the determined virtual channel VC0.

Figure 7:
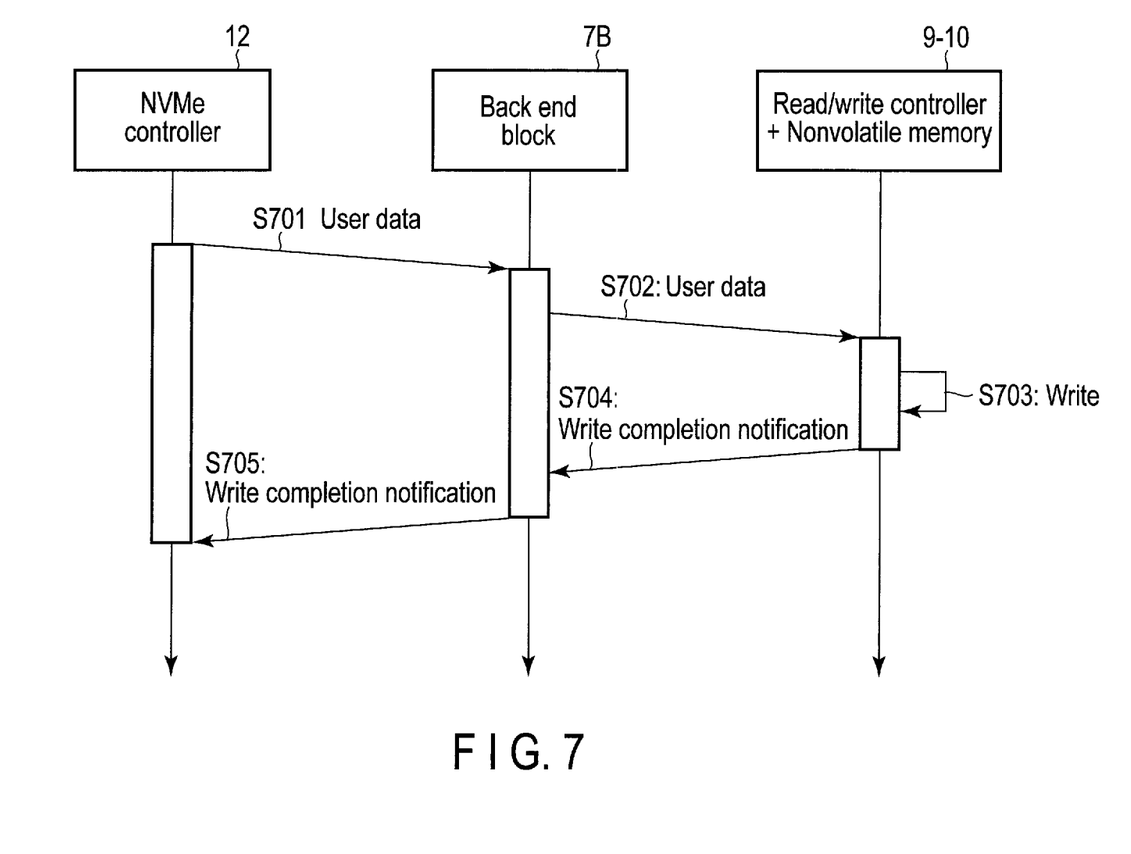
FIG. 7 is a sequence chart illustrating an example of NVM write command execution in the memory system of the embodiment.

FIG. 7 is a sequence chart illustrating an example of NVM write command execution in the memory system 2 of the embodiment. FIG. 7 corresponds to step S514 of FIG. 5. In FIG. 7, the read/write controller 9 and the nonvolatile memory 10 are illustrated as one block 9-10 to simplify the description. The description of FIG. 7 focuses on the items that are associated with the virtual channel VC0. The corresponding descriptions for the virtual channels VC1 to VC4 are omitted, as the concept is the same.

In step S701, the NVMe controller 12 instructs the back end block 7B to execute an NVM write command. The DMA circuit 140 transfers the user data 3W from the queue circuit 130 to the area 160. Both the queue circuit 130 and the area 160 are associated with virtual channel VC0.

In step S702, the back end block 7B transfers the user data 3W to the read/write controller 9.

In step S703, the read/write controller 9 writes the user data 3W to the area 100 of the nonvolatile memory 10, which is associated with the virtual channel VC0.

In step S704, the read/write controller 9 transmits a write completion notification to the back end block 7B.

In step S705, the back end block 7B transmits the write completion notification to the NVMe controller 12.

The benefits of using the information processing system 1A according to the above-described embodiment are described next.

In the present embodiment, the memory system 2 manages the priority relation information 6 in which the NVMe priority information 61 is associated with the PCIe priority information 62. In the embodiment, communication information that is set to have a higher priority in NVMe is transmitted and received using a virtual channel having a higher priority, and vice-versa, between the information processing device 1 and the memory system 2.

Thus, the controller 7 according to the embodiment can execute a communication transaction with different priority, while complying with PCIe (for example, determination of a virtual channel to be used) and NVMe.

In the embodiment, communication information with different priorities in NVMe can be transmitted and received via different virtual channels VC0 to VC4. Furthermore, NVM command processing is executed in association with the virtual channels VC0 to VC4, from a begin stage where the memory system 2 receives a command notification from the information processing device 1, to an end stage where the memory system 2 transmits a completion to the information processing device 1. QoS of the whole transaction between the information processing device 1 and the memory system 2 can thus be improved.

In the embodiment, the processor 15 of the back end block 7B separately uses the areas 160 to 164 of the memory 16 in accordance with the priorities of the virtual channels VC0 to VC4. The areas 100 to 104 of the nonvolatile memory 10 are also managed based on the same priorities scheme. So, read and write operations to the nonvolatile memory 10 can be executed with different priorities, to further improve the QoS.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
   a nonvolatile memory; and
   a controller configured to execute communication with an external device via virtual channels including a first virtual channel and a second virtual channel, the virtual channels complying with Peripheral Component Interconnect Express Base Specification (PCIe), the first virtual channel being defined in PCIe to have a first priority, the second virtual channel being defined in PCIe to have a second priority, the second priority being lower than the first priority, and control the nonvolatile memory, wherein the controller is further configured to:
   manage a set of priority relation information in which the first virtual channel is associated with a third priority defined in a specification that is different from PCIe, and the second virtual channel is associated with a fourth priority defined in the specification that is different from PCIe, the fourth priority being lower than the third priority;
   receive, from the external device, first communication information corresponding to the third priority or second communication information corresponding to the fourth priority;
   in response to receiving the first communication information, determine, based on the set of priority relation information that has been managed before receiving the first communication information, the first virtual channel to request third communication information associated with the first communication information, and request the third communication information from the external device via the determined first virtual channel; and
   in response to receiving the second communication information, determine, based on the set of priority relation information that has been managed before receiving the second communication information, the second virtual channel to request fourth communication information associated with the second communication information, and request the fourth communication information from the external device via the determined second virtual channel.

2. The memory system of claim 1, wherein
   the specification that is different from PCIe is Non Volatile Memory Express Base Specification (NVMe), and the priorities used for associating communication information are based on Weighted Round Robin with Urgent Priority Class Arbitration (WRRUPCA) mechanism defined in NVMe.

3. The memory system of claim 1, wherein
the controller is further configured to process the third communication information and the fourth communication information in accordance with the third priority and the fourth priority, respectively.

4. The memory system of claim 1, further comprising:
a memory to store the set of priority relation information, wherein
the controller is further configured to determine the third priority corresponding to the first virtual channel and the fourth priority corresponding to the second virtual channel, based on the set of priority relation information stored in the memory.

5. The memory system of claim 1, wherein
the first communication information is a command notification,
the third communication information is a command, and
the controller is further configured to:
  receive the command notification from the external device;
  determine which priority is associated with the command, based on how the command notification is sent to the controller;
  determine which virtual channel to be used to process the command, based on the set of priority relation information;
  transmit a command request to the external device via the determined virtual channel; and
  receive the command corresponding to the command request from the external device, via the determined virtual channel.

6. The memory system of claim 1, wherein
subsequent communication information associated with the first communication information is transmitted and received between the controller and the external device via the first virtual channel without using the second virtual channel, and
subsequent communication information associated with the second communication information is transmitted and received between the controller and the external device via the second virtual channel without using the first virtual channel.

7. The memory system of claim 6, wherein
the first communication information is a command notification of a first command,
the subsequent communication information associated with the first communication information includes a command request, the first command, a descriptor of data-transfer, data transmitted or received between the controller and the external device per execution of the first command, and a completion,
the second communication information is a command notification of a second command, and
the subsequent communication information associated with the second communication information includes a command request, the second command, a descriptor of data-transfer, data transmitted or received between the controller and the external device per execution of the second command, and a completion.

8. The memory system of claim 1, wherein the controller is further configured to:
transmit fifth communication information associated with the first communication information to the external device via the first virtual channel; and
transmit sixth communication information associated with the second communication information to the external device via the second virtual channel.

9. The memory system of claim 8, wherein
the first communication information is a command notification of a first command,
the fifth communication information includes a command request of the first command, a descriptor of data-transfer request, data transmitted from the controller to the external device based on executing the first command, and a completion of the first command,
the second communication information is a command notification of a second command, and
the sixth communication information includes a command request of the second command, a descriptor of data-transfer request, data transmitted from the controller to the external device based on executing the second command, and a completion of the second command.

10. The memory system of claim 8, wherein the controller is further configured to:
receive seventh communication information associated with the first communication information from the external device via the first virtual channel; and
receive eighth communication information associated with the second communication information from the external device via the second virtual channel.

11. The memory system of claim 1, wherein
the first communication information is a command notification of a first command,
the third communication information is the first command,
the second communication information is a command notification of a second command, and
the fourth communication information is the second command.

12. The memory system of claim 1, wherein
the controller further includes queue circuits corresponding to the virtual channels, respectively; and
the controller is further configured to
  store the third communication information received from the external device via the first virtual channel in a first queue circuit corresponding to the first virtual channel, of the queue circuits;
  store the fourth communication information received from the external device via the second virtual channel in a second queue circuit corresponding to the second virtual channel, of the queue circuits; and
  process the third communication information stored in the first queue circuit with a higher priority than the fourth communication information stored in the second queue circuit.

13. The memory system of claim 12, wherein
the controller further includes buffer memories corresponding to the virtual channels, respectively; and
the controller is further configured to
  store the third communication information received from the external device via the first virtual channel in a first buffer memory corresponding to the first virtual channel, of the buffer memories, and then transfer the third communication information to the first queue circuit;
  store the fourth communication information received from the external device via the second virtual channel in a second buffer memory corresponding to the second virtual channel, of the buffer memories, and then transfer the fourth communication information to the second queue circuit; and process the third communication information stored in the first buffer memory with a higher priority than the fourth communication information stored in the second buffer memory.

14. The memory system of claim 13, wherein
the controller further includes multiple instances of data transfer circuits corresponding to the virtual channels, respectively, and a memory including multiple memory areas corresponding to the virtual channels, respectively,
a first data transfer circuit, corresponding to the first virtual channel, transfers data associated with the third communication information stored in the first queue circuit to one of the memory areas corresponding to the first virtual channel,
a second data transfer circuit, corresponding to the second virtual channel, transfers data associated with the fourth communication information stored in the second queue circuit to one of the memory areas corresponding to the second virtual channel, and
the first data transfer circuit has a higher priority to execute transfer, compared to the second data transfer circuit.

15. The memory system of claim 14, wherein
the controller further includes a controller circuit configured to transfer both first user data stored in a first memory area of the memory areas, and second user data stored in a second memory area of the memory areas, to the nonvolatile memory; and
the controller is further configured to process the first user data stored in the first memory area with a higher priority than the second user data stored in the second memory area.

16. A memory system, comprising:
a nonvolatile memory; and
a controller configured to be connected with an external device via physical communication lines, and configured to communicate with the external device via multiple virtual channels including a first virtual channel and a second virtual channel, the first virtual channel being defined in a first communication protocol to have a first priority, the second virtual channel being defined in the first communication protocol to have a second priority, the second priority being lower than the first priority, wherein the controller is further configured to:
manage a set of priority relation information in which the first virtual channel is associated with a third priority of a second communication protocol, and the second virtual channel is associated with a fourth priority of the second command protocol, the fourth priority having a lower priority than the third priority;
receive, from the external device, first communication information corresponding to the third priority or second communication information corresponding to the fourth priority;
request, in response to receiving the first communication information, third communication information associated with the first communication information from the external device via the first virtual channel, based on the priority relation information; and
request, in response to receiving the second communication information, fourth communication information associated with the second communication information from the external device via the second virtual channel, based on the priority relation information.

17. The memory system of claim 16, wherein
the first communication information is a command notification of a first command,
the third communication information is the first command,
the second communication information is a command notification of a second command, and
the fourth communication information is the second command.

18. A control method of a memory system, the memory system including a nonvolatile memory and a controller, the controller being configured to communicate with an external device via virtual channels in compliant with Peripheral Component Interconnect Express Base Specification (PCIe), the virtual channels including a first virtual channel and a second virtual channel, the first virtual channel being defined in PCIe to have a first priority, the second virtual channel being defined in PCIe to have a second priority, the second priority being lower than the first priority, said method comprising:
managing a set of priority relation information in which the first virtual channel is associated with a third priority defined in a specification that is different from PCIe and the second virtual channel is associated with a fourth priority defined in the specification that is different from PCIe, the fourth priority being lower than the third priority;
receiving, from the external device, first communication information corresponding to the third priority or second communication information corresponding to the fourth priority;
in response to receiving the first communication information, determining, based on the set of priority relation information that has been managed before receiving the first communication information, the first virtual channel to request third communication information associated with the first communication information, and requesting the third communication information from the external device via the determined first virtual channel; and
in response to receiving the second communication information, determining, based on the set of priority relation information that has been managed before receiving the second communication information, the second virtual channel to request fourth communication information associated with the second communication information, and requesting the fourth communication information from the external device via the determined second virtual channel.

19. The control method of claim 18, wherein
the first communication information is a command notification associated with a first command,
the third communication information is the first command,
the second communication information is a command notification associated with a second command, and
the fourth communication information is the second command.

* * * * *